(12) United States Patent
Stefanini

(10) Patent No.: US 8,231,786 B2
(45) Date of Patent: Jul. 31, 2012

(54) WATER PURIFICATION METHOD AND APPARATUS INVOLVING GENERATION OF BIPOLAR LAYER

(75) Inventor: Daniel Stefanini, Beeston (GB)

(73) Assignee: HydroPath Holdings Limited, London (GB)

( * ) Notice: Subject to any disclaimer, the term of this patent is extended or adjusted under 35 U.S.C. 154(b) by 751 days.

(21) Appl. No.: 12/090,298

(22) PCT Filed: Oct. 12, 2006

(86) PCT No.: PCT/GB2006/003794
§ 371 (c)(1),
(2), (4) Date: Jul. 17, 2008

(87) PCT Pub. No.: WO2007/045824
PCT Pub. Date: Apr. 26, 2007

(65) Prior Publication Data
US 2009/0218225 A1 Sep. 3, 2009

(30) Foreign Application Priority Data
Oct. 15, 2005 (GB) .................................. 0520977.0

(51) Int. Cl.
*B01D 61/00* (2006.01)
*B01D 37/00* (2006.01)
*B01J 19/12* (2006.01)

(52) U.S. Cl. ..... 210/650; 210/652; 210/767; 210/257.2; 204/193; 204/415

(58) Field of Classification Search ................ 204/247.1, 204/660, 665, 554, 415, 155, 514, 516, 518, 204/571, 193; 210/650, 652, 767, 257.2
See application file for complete search history.

(56) References Cited

U.S. PATENT DOCUMENTS

| | | | |
|---|---|---|---|
| 3,197,394 A | 7/1965 | McEuen | |
| 3,637,482 A | 1/1972 | Vajda | |
| 4,233,134 A | 11/1980 | King | |
| 4,319,979 A | 3/1982 | King | |
| 4,507,193 A | 3/1985 | King | |
| 5,540,819 A | 7/1996 | Bakhir | |
| 5,948,273 A * | 9/1999 | Yoshida et al. | ............... 205/751 |

(Continued)

FOREIGN PATENT DOCUMENTS

DE 198 06 796 9/1999

(Continued)

OTHER PUBLICATIONS

International Search Report, Corresponding to International Application No. PCT/GB2006/003794, Mailed Jan. 18, 2007.

(Continued)

*Primary Examiner* — Ana Fortuna
(74) *Attorney, Agent, or Firm* — Kirschstein, et al.

(57) ABSTRACT

Water treatment method and apparatus according to which supply water containing dissolved matter is delivered to at least one treatment surface. An electric field is created in the vicinity of the treatment surface to cause a hydration layer to be established due to the bipolar nature of the water molecules. Water is then extracted from the hydration layer. Such extraction may be effected by osmosis or by removal of the element (s) from the supply water with the hydration layer water thereon, dehydration layer water subsequently being extracted from the element (s). The method has been devised to reduce energy consumption for the purpose of providing potable water from seawater.

13 Claims, 3 Drawing Sheets

U.S. PATENT DOCUMENTS

| | | | |
|---|---|---|---|
| 6,217,773 B1 * | 4/2001 | Graham | 210/651 |
| 6,491,820 B2 * | 12/2002 | Held et al. | 210/609 |
| 6,558,537 B1 * | 5/2003 | Herrington et al. | 210/192 |
| 6,802,981 B2 * | 10/2004 | Ryazanova et al. | 210/726 |
| 7,008,540 B1 * | 3/2006 | Weavers et al. | 210/636 |
| 7,229,555 B1 * | 6/2007 | Edinger | 210/652 |
| 2006/0108286 A1 | 5/2006 | Hambitzer | |

FOREIGN PATENT DOCUMENTS

| | | |
|---|---|---|
| DE | 19806796 | 9/1999 |
| DE | 10332789 | 2/2005 |
| JP | 58-109183 | 6/1983 |
| JP | 4-150992 | 5/1992 |
| JP | 10 323545 | 12/1998 |
| JP | 2004-0283636 | 10/2004 |
| WO | 9611050 | 4/1996 |
| WO | WO 98/03245 | 1/1998 |
| WO | WO 2005/089913 A1 | 9/2005 |
| WO | WO 2005/108304 | 11/2005 |
| WO | WO 2006/039873 | 4/2006 |

OTHER PUBLICATIONS

Search Report Corresponding to British Application No. GB0520977.0, Completed Mar. 1, 2006.

* cited by examiner

WATER PURIFICATION METHOD AND APPARATUS INVOLVING GENERATION OF BIPOLAR LAYER

CROSS-REFERENCE TO RELATED APPLICATIONS

This application is a United States national stage application under 35 U.S.C. §371 of International Application No. PCT/GB2006/003794, filed Oct. 12, 2006, which claims benefit of Great Britain Patent Application No. 0520977.0 filed Oct. 15, 2005; both of which are hereby incorporated by reference in their entireties to the extent not inconsistent with the disclosure herein.

DESCRIPTION OF INVENTION

This invention relates to a method of, and apparatus for, purification treatment of water. The invention has been devised in order to reduce the energy consumption in such treatment for the purpose of desalination of sea water, to provide potable water.

In many parts of the world the only way in which the demand for potable water can be met is by desalination of sea water, there being no other practicable water source. Unfortunately, known desalination techniques consume large quantities of energy, aggravating the world's problems of energy consumption.

There are two principal known desalination techniques. The first is distillation, in which the saline feed water is heated to produce steam which is then condensed to provide water of the required quality. Typically, for every 100 gallons of sea water used, 15 to 50 gallons of fresh water would be produced, the remainder being waste brine solution containing a higher quantity of dissolved solids than the original sea water. Such waste brine is discharged back to the sea.

The other principal technique used in desalination is reverse osmosis, in which the intake sea water is supplied to one side of a semi-permeable membrane and subjected to high pressure. Molecules of salt do not pass through the membrane, but the water does, so that the water on the other side of the membrane from the sea water is a useable product.

It is self evident that the energy consumption associated with distillation as a desalination technique is high, but the pressures required for the reverse osmosis technique to function are so high that this technique also has a high energy consumption. Accordingly it is an object of the present invention to provide for water purification, e.g. desalination, in a way in which energy consumption is lower.

According to one aspect of the invention, we provide a method of water treatment to provide relatively purified water from a supply containing dissolved matter, comprising creating an electric field to cause a hydration layer of water molecules to be established in the supply water, and extracting the water from the hydration layer.

Preferably the method comprises delivering the supply water to at least one treatment surface; creating the electric field, to cause a hydration layer to be established, in the vicinity of the surface(s); and extracting the hydration layer water from the vicinity of the surface(s).

The invention also provides apparatus for treating water to provide relatively purified water from a supply containing dissolved matter, comprising means for creating an electric field in the supply water to cause a hydration layer to be established therein, and means for extracting the water from the hydration layer.

There may be means for delivering the supply water to at least one treatment surface; means for creating the electric field in the vicinity of the treatment surface(s); and means for extracting the hydration layer water from the vicinity of the surface(s).

The invention makes use of the principle that when subject to an electric field, e.g. adjacent a surface having an electric charge, water molecules orient themselves in accordance with the field and being polar molecules the structure of the hydrogen bond network in the water molecules is changed. Around a charged particle a hydration shell is established comprising a thin layer of oriented water molecules. The thickness of the layer, in terms of molecules, depends on the magnitude of the charge. In the hydration layer the water molecules exclude other molecules and ions. Thus, although the hydration layer is thin and of thickness only that of a few molecules (the thickness depending on the strength of the electric field at the surface) the water in the hydration layer is substantially pure water, which can be extracted for use with much less energy being consumed in such extraction than if the hydration layer were not present. Although establishing the electric field involves some energy consumption, the overall result is a reduction in energy consumption.

The treatment surface or surfaces, at or in the vicinity of which an electric field is created, may comprise a semi-permeable membrane, and the water from the hydration layer in the vicinity thereof may be extracted by subjecting the supply water to pressure to cause osmotic flow of the hydration layer water through the membrane.

Then, the water which is on the other side of the membrane from the supply water, having passed through the membrane, is substantially purified e.g. desalinated.

When the extraction of the water from the hydration shell is effected by osmosis, the pressure required to cause such osmosis is substantially less than that required for conventional desalination by reverse osmosis. Hence, the energy consumption in the desalination process can be greatly reduced.

The electric field at the treatment surface may be created by applying an electric charge thereto, or to an electrode adjacent the surface. The charge may be applied as a square wave signal including square shaped pulses separated by spaces (of zero signal).

The advantage of using such a wave form to create the electric field in the vicinity of the surface is that during the pulses the electric field is applied quickly, and the hydration layer established (which takes a finite albeit small time). During the spaces between the pulses, the hydration layer is released and is able to pass through the membrane under pressure.

As an alternative to extraction of the hydration layer water by causing it to pass through a membrane, the water may be extracted by providing the at least one treatment surface on an element moveable relative to the supply of water and a part of which is able to be withdrawn from the supply water with the hydration layer water thereon, to a position in which the hydration layer water can be removed from the element.

The element may be rotatable and have a circumferential part immersed in the supply water and a part extending above the supply water, so that hydration layer water can, by rotation of the element, be lifted above the supply water to a position in which it can be extracted from the element.

Such a rotatable element may have a surface which is able to be electrically charged to establish the hydration layer thereon and discharged to release the hydration layer water. It may be in the form of a hollow roller, having an internal charging electrode to charge the surface thereof at a position within the supply water and a discharge electrode at a position above the level of the supply water, where the hydration layer water on the surface thereof is to extracted.

In another embodiment, the treatment surface may be afforded by a plurality of discreet elements movable within the supply water and able to be removed therefrom bearing the hydration layer water which is subsequently removed from the elements.

Such elements may be of a material able to have an electric charge applied thereto and discharged therefrom respectively when introduced into and removed from the supply water. They may also have magnetic properties so that the removal thereof from the supply water can be effected by a magnetic removal element.

The invention will now be described by way of example with reference to the accompanying drawings of which:

Figure 1:
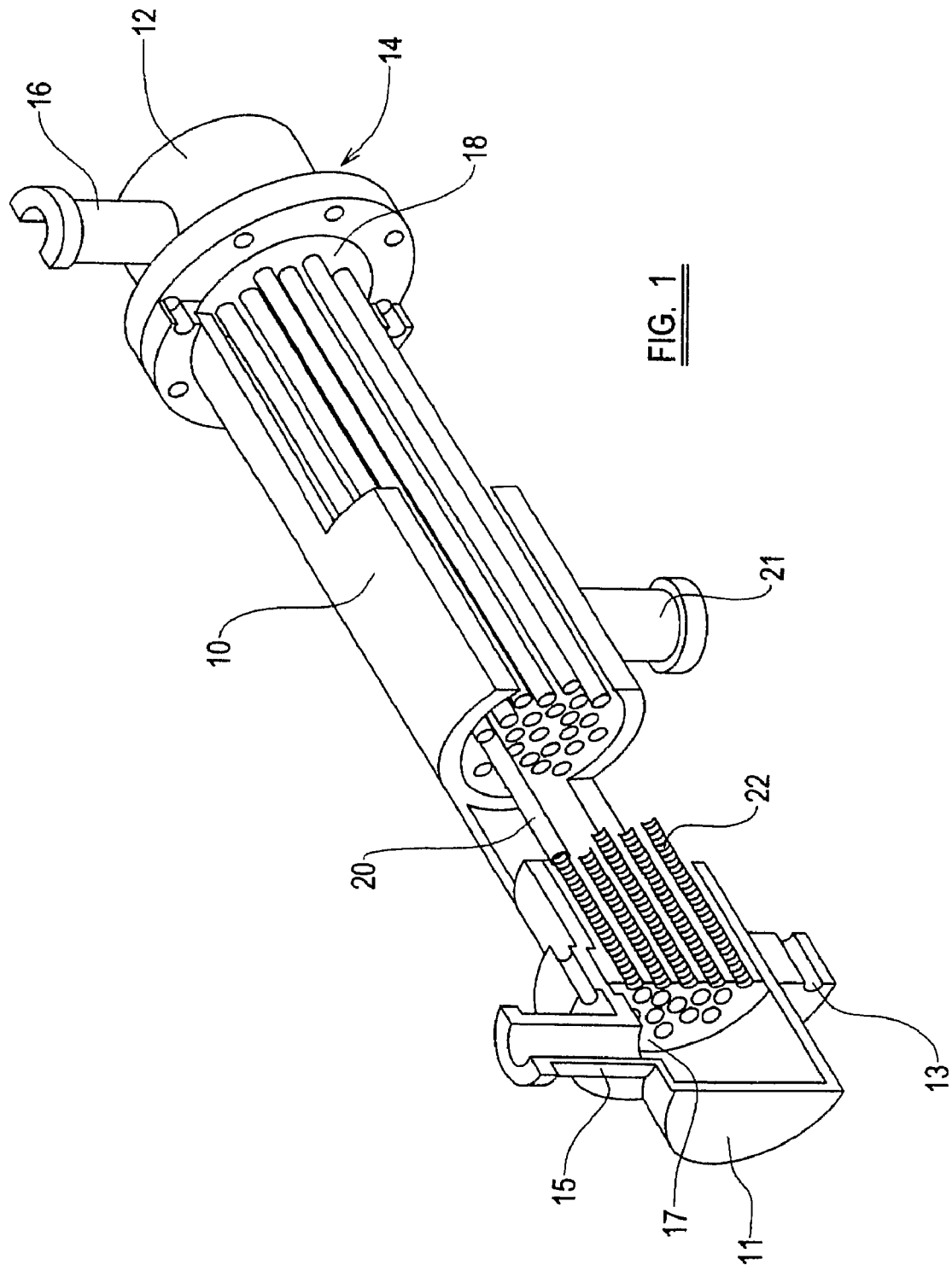
FIG. 1 is a perspective view of a first embodiment of apparatus to carrying out the method of the invention.

Referring firstly to FIG. 1 of the drawings, this shows a first embodiment of apparatus accordingly to the invention. It comprises a hollow cylindrical casing 10 having end caps 11, 12 respectively joined to the casing 10 at bolted flanged pressure-tight joints 13, 14. The end caps 11, 12 have respective pipes 15, 16 one of which is for inlet of supply water to the treatment apparatus and the other for outlet thereof. At the ends of the casing 10 there are provided tube plates 17, 18 and between these two plates extend a number of tubular treatment elements 20 which incorporate semi-permeable membranes allowing reverse osmosis between their inner and outer surface. Generally in its mid-region the casing 10 has an outlet pipe 21 communicating with the space surrounding the tubes 20, between the tube plates 17, 18. Within each of the tubes 20 there is disposed a helical wire electrode lying closely adjacent to its inner surface, as indicated at 22.

In use, supply water e.g. sea water is introduced through one of the pipes 15, 16 and passes through the tubular elements 20 to be discharged through the other of the pipes 15, 16. A square-wave voltage is applied to the electrodes 22, comprising square-shaped pulses with spaces therebetween. During such pulses, hydration layers are formed on the electrodes in the vicinity of the internal surfaces of the elements 20. In the spaces between the pulses of the square-wave, the pure hydration layer water is released and is able to pass through the membranes of the elements 20. A sufficient pressure is maintained in the supply water for such osmotic transportation of the hydration layer water to take place effectively. Having passed through the membranes of the elements 20, the purified hydration layer water is discharged through the pipe 21. The supply water discharged from the apparatus is of course of higher saline concentration than that introduced to the apparatus.

In a possible alternative, the electrodes 22 may be substituted by providing the inner surface of the tubular elements 20 with a porous conductive layer so that the hydration layer is established at the internal surface of the elements 20 rather than closely in the vicinity thereof as is the case with the helical electrodes 22. A porous conductive layer affording as large a surface area as possible at which a hydration layer can be established, may be provided by a conductive open-cell foamed material.

Figure 2:
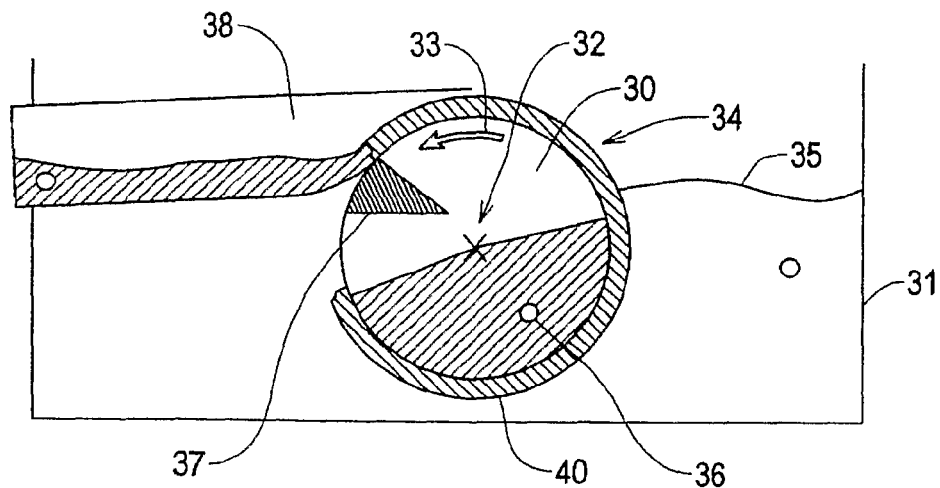
FIG. 2 illustrates diagrammatically a second apparatus for carrying out the method of the invention.

Referring now to FIG. 2 of the drawings, an alternative apparatus for carrying out the invention illustrates a hollow cylindrical treatment element 30 in a receptacle 31 containing supply water to be treated e.g. sea water. The element 30 is rotatable about its central longitudinal axis indicated at 32, in the direction of arrow 33, and it will be noted that part indicated at 34 of the surface of the element 30 extends above the normal level 35 of supply water within the receptacle 31.

Within the element 30 there is disposed a charging electrode 36 and a discharge electrode 37, the element 30 being of a material such that it can be electrically charged by the electrode 36 and maintain the electric field caused by such charge on its exterior surface until discharged by the electrode 37. The electrodes 36, 37 are, in effect, capacitively coupled to the surface of the element 30 on which the electric field is established.

Adjacent the discharge electrode 37, a fresh water outlet conduit 38 contacts the external surface of the element 30.

In use, with the element 30 rotating in the direction of arrow 33 the charge established thereon by the charge electrode 36 causes a hydration layer 40 of pure water to be established on its external surface and the rotation of the element 30 causes such layer of water to be carried above the surface 35 of the supply water to the vicinity of the discharge electrode 37. When the electric field on the element is reduced to zero by the discharge electrode 37, the hydration layer water is free to flow into the fresh water conduit 38 to be delivered to wherever it is required.

Figure 3:
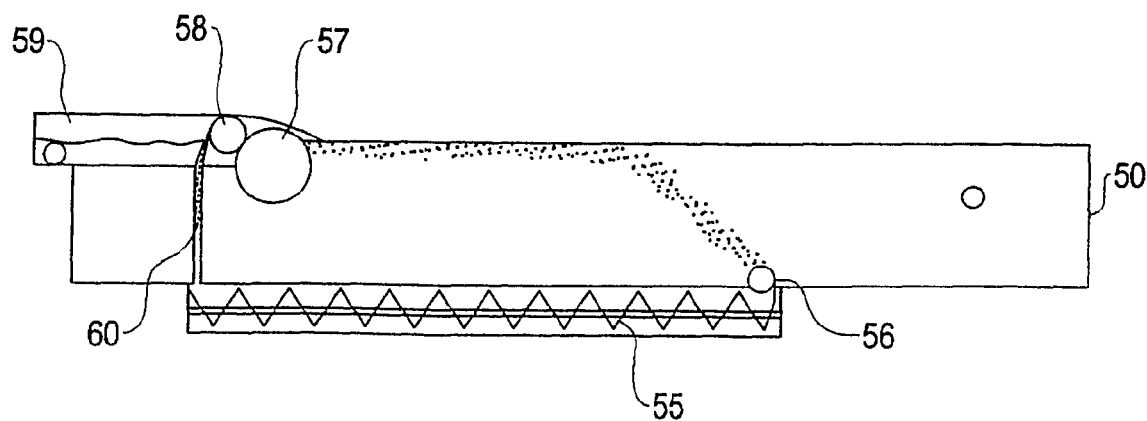
FIG. 3 illustrates diagrammatically a third embodiment of apparatus for carrying out the invention.
Figure 4:
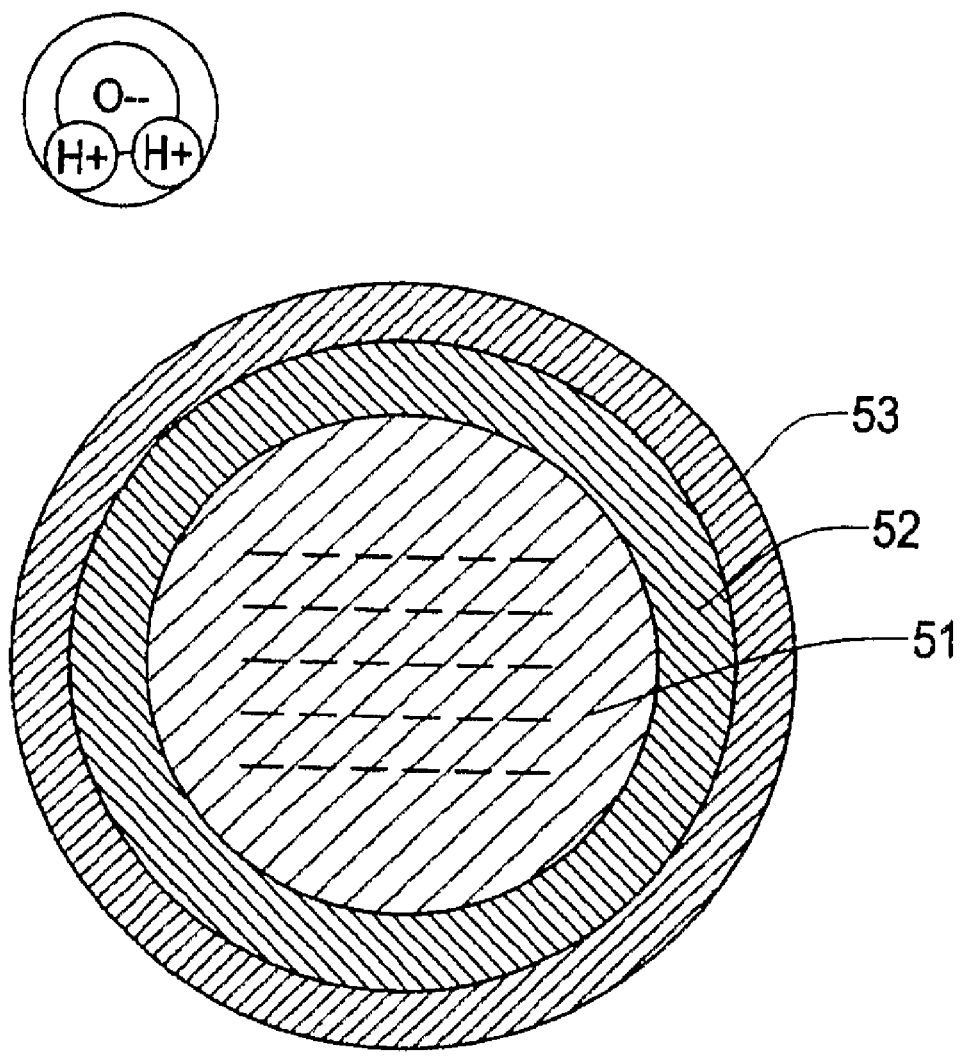
FIG. 4 is a cross-section through an element for use in the apparatus in FIG. 3.

Referring now to FIGS. 3 and 4 of the drawings, these show a receptacle, e.g. a conduit, 50 containing supply water e.g. sea water. The apparatus makes use of a large number of treatment elements as shown in FIG. 4, each comprising a ferrite core 51 able to be magnetised and also electrically charged to maintain an electric field. The core 51 is coated with a conductive material 52 giving the element sufficient buoyancy to float in the supply water. Such an element, if charged with a negative electric charge, will be surrounded by a hydration layer 53 of water.

FIG. 3 shows feed screw 55 provided in the bottom of the receptacle 15, delivering elements as shown in FIG. 4 continuously to a rotatable charge electrode 56 which is magnetised on three quarters of its circumference. The elements are collected by the electrode and charged electrically, and as the electrode 56 rotates its magnetic field is switched off and the charged elements released into the salt water. The elements flow towards the top of the receptacle 50, and are collected by a collecting roller 57 which is similar in construction to the charge electrode. A discharge electrode 58 discharges the electric field from the elements, releasing the pure water to flow into a water outlet conduit 59, while the treatment elements are delivered at 60 to the feed screw 55.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of water treatment to provide relatively-purified water from supply water containing dissolved matter, the method comprising the steps of:

delivering the supply water to at least one treatment surface provided on at least one movable element movable relative to the supply water;

creating an electric field at or in the vicinity of the at least one treatment surface to electrically charge the at least one treatment surface to cause a hydration layer of water molecules to be established in the supply water in the vicinity of the at least one treatment surface;

partially withdrawing the at least one movable element from the supply water with the hydration layer on the at least one movable element; and extracting the hydration layer by electrically discharging the at least one treatment surface to release the hydration layer from the at least one movable element subsequent to the withdrawing step.

2. The method according to claim 1, and the steps of immersing a part of the at least one movable element into the supply water, and leaving another part of the at least one movable element to extend above the supply water; and wherein the withdrawing step is performed by rotating the at least one movable element and thereby lifting the hydration layer to a position above the supply water.

3. The method according to claim 1, wherein the supply water is delivered to a plurality of treatment surfaces respectively provided on a plurality of movable elements movable relative to the supply water and discrete from one another.

4. An apparatus for water treatment to provide relatively-purified water from supply water containing dissolved matter, the apparatus comprising:

at least one movable element movable relative to the supply water and having a part immersed in the supply water;

at least one treatment surface to which the supply water is delivered, the at least one treatment surface being provided on the at least one movable element;

means for creating an electric field in the supply water at or in the vicinity of the at least one treatment surface to electrically charge the at least one treatment surface to cause a hydration layer of water molecules to be established in the supply water in the vicinity of the at least one treatment surface; and means for extracting the hydration layer by partially withdrawing the at least one movable element from the supply water with the hydration layer on the at least one movable element to a position in which the hydration layer can be removed from the at least one movable element, and by electrically discharging the at least one treatment surface to release the hydration layer from the at least one movable element.

5. The apparatus according to claim 4, wherein the at least one movable element is mounted for rotation about an axis, and wherein the immersed part extends circumferentially of the axis, and wherein the at least one movable element has another part that extends above the supply water in said position.

6. The apparatus according to claim 4, wherein the at least one movable element comprises a hollow roller having an internal charging electrode for charging the at least one treatment surface at a position within the supply water, and a discharge electrode for discharging the at least one treatment surface at a position above the level of the supply water.

7. The apparatus according to claim 4, wherein the at least one treatment surface is provided on a plurality of discrete elements; and wherein the discrete elements are movable within the supply water, and removable from the supply water while bearing the hydration layer for subsequent removal from the discrete elements.

8. The apparatus according to claim 7, wherein the discrete elements comprise a material capable of being electrically charged when introduced into the supply water, and capable of being electrically discharged when removed from the supply water.

9. The apparatus according to claim 8, wherein the discrete elements comprise a material capable of being magnetically attracted, and further comprising magnetic means for attracting the discrete elements for effecting removal of the discrete elements from the supply water.

10. A method of water treatment to provide relatively-purified water from supply water containing dissolved matter, the method comprising the steps of:

delivering the supply water under pressure to one surface of a semi-permeable osmotic membrane;

creating an electric field by applying an electric charge as successive pulses to a porous conductive layer of the osmotic membrane or an electrode adjacent to the osmotic membrane, for causing a hydration layer of water molecules to be established in the supply water at the one surface of the osmotic membrane; and extracting the hydration layer by passing the hydration layer by osmosis through the osmotic membrane past an opposite surface of the osmotic membrane.

11. The method according to claim 10, wherein the creating step is performed by applying the electric charge as a square wave signal including square-shaped pulses separated by spaces.

12. An apparatus for water treatment to provide relatively-purified water from supply water containing dissolved matter, the apparatus comprising:

a semi-permeable osmotic membrane having one surface;

means to deliver the supply water under pressure;

means for creating an electric field by applying an electric charge as successive pulses to a porous conductive layer of the osmotic membrane or an electrode adjacent to the osmotic membrane, for causing a hydration layer of water molecules to be established in the supply water at the one surface of the osmotic membrane; and wherein the hydration layer is extracted by passing the hydration layer by osmosis through the osmotic membrane past an opposite surface of the osmotic membrane.

13. The apparatus according to claim 12, wherein the creating means is operative for applying a square wave electrical signal to the porous conductive layer of the osmotic membrane or the electrode.

* * * * *